United States Patent
Takahashi

(10) Patent No.: US 8,320,713 B2
(45) Date of Patent: Nov. 27, 2012

(54) IMAGE PROCESSING ENABLING DECODING OF ENCODED INFORMATION EMBEDDED IN SOURCE DOCUMENT

(75) Inventor: Yasuhiro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 12/388,850

(22) Filed: Feb. 19, 2009

(65) Prior Publication Data

US 2009/0214137 A1    Aug. 27, 2009

(30) Foreign Application Priority Data

Feb. 25, 2008  (JP) ................. 2008-043339

(51) Int. Cl.
G06K 9/32 (2006.01)
(52) U.S. Cl. ........................................ 382/298
(58) Field of Classification Search .......... 382/298, 382/300, 276, 293, 312; 358/1.2, 1.9, 3.28
See application file for complete search history.

(56) References Cited

U.S. PATENT DOCUMENTS

| | | | | |
|---|---|---|---|---|
| 6,512,541 B2 * | 1/2003 | Dunton et al. | ............. | 348/230.1 |
| 7,193,744 B2 * | 3/2007 | Kashihara | ...................... | 358/1.9 |
| 2003/0179399 A1 | 9/2003 | Matsunoshita | .............. | 358/1.13 |
| 2006/0209350 A1 | 9/2006 | Tabata | ......................... | 358/3.28 |

FOREIGN PATENT DOCUMENTS

| | | |
|---|---|---|
| JP | 2000-134465 | 5/2000 |
| JP | 2003-280469 A | 10/2003 |
| JP | 2004-282633 | 10/2004 |
| JP | 2006-173909 | 6/2006 |
| JP | 2006-262487 | 9/2006 |

* cited by examiner

*Primary Examiner* — Yon Couso
(74) *Attorney, Agent, or Firm* — Fitzpatrick, Cella, Harper & Scinto

(57) ABSTRACT

An image processing apparatus that receives an image from a scanner capable of optical scaling is provided by the present invention. It has an image scaling unit for performing digital scaling of a received image, and an information detecting unit for detecting encoded information from the received image. Unless the scaling factor is that suitable for optical scaling, the received image undergoes the digital scaling instead of the optical scaling. Before the received image undergoes the digital scaling, the information detecting unit detects the encoded information from the received image. The scaling using the image reading device capable of optical scaling enables more accurate analysis of the encoded information embedded in a source document.

12 Claims, 11 Drawing Sheets

EXAMPLE OF LVBC PRINTED
ON SOURCE DOCUMENT

VIRTUAL GRID

IMAGE PROCESSING ENABLING DECODING OF ENCODED INFORMATION EMBEDDED IN SOURCE DOCUMENT

BACKGROUND OF THE INVENTION

1. Field of the Invention

The present invention relates to an image processing apparatus and its control method. More particularly, the present invention relates to enabling reliable decoding of the encoded information embedded in a source document when carrying out enlarging or reducing scanning of the source document in which the encoded information such as security additional information is embedded.

2. Description of Related Art

Recently, as office IT has been promoted, there has been a growing interest in security. For example, cases of leaking customer information corporations retain have occurred frequently, which threatens top secrets of organization or personal privacy and becomes an issue of public concern.

To deal with such problems, an IT (Information Technology) mechanism has been introduced which provides access rights to electronized top secret information or provides a firewall with a monitoring device so as to prevent leakage to the outside of the corporations. Alternatively, a measure is taken to forbid bringing a transportable medium such as a note PC and USB memory in or out of an office. As for the electronized top secret information, the measure using the IT mechanism as described above can prevent the leakage to some extent. This is because the electronic information cannot be accessed without using IT, and hence it is easy to introduce the mechanism thereinto.

On the other hand, if the top secret information of organization or personal privacy information is printed on a paper medium with an image forming device, then trying to maintain the security by checking or forbidding taking out the medium will involve circumventing the conventional IT mechanism. Thus, it is harder to forbid taking out the paper medium than to limit taking out the electronized top secret information, which makes it difficult to maintain the security.

To deal with the problem, various countermeasures against information leakage have been taken conventionally.

As a first countermeasure against information leakage, systems have been developed which embed tracking information in a paper medium itself in addition to a main image (source document image) at the printing using information embedding technology such as a known digital watermarking technique and two-dimensional bar code. According to these systems, even if the information leakage of the paper medium occurs, the tracking information can be extracted by analyzing the leaked source document. Thus, as for unexpected taking out of the source document, it is possible to find out who is to blame from the tracking information, and hence deterrent effect can be expected.

As a second conventional countermeasure against information leakage, systems have been developed which embed copy restricting information for forbidding copy on a paper medium itself when carrying out printing using known digital watermarking technique or two-dimensional bar code technology. In the systems, a corresponding image forming device detects whether copy is permitted or not by extracting the copy restricting information at the copying, and is able to control carrying on or halting the copy page by page. In addition, systems are also proposed which permit only specified users to make copies by embedding not only the copy restricting information simply indicating pros and cons of the copying, but also password information or authorized user information as condition information. Such a system is disclosed in Japanese Patent Laid-Open No. 2003-280469. The foregoing tracking information and copy restricting information are generically referred to as "security additional information" from now on.

When performing a scaling copying conventionally, regardless of whether the security additional information is embedded in a source document or not, different scaling processing is performed in the paper feed direction (subscanning direction) of the source document and in the direction perpendicular to the paper feed direction (main scanning direction). More specifically, as for the scaling in the paper feed direction (subscanning direction) of the source document, it is the so-called optical scaling that achieves the scaling by changing scanning speed. In contrast, as for the scaling in the direction perpendicular to the paper feed direction (main scanning direction), it is carried out by combining digital image data acquired by scanning with digital scaling processing. Applying the optical scaling to the scaling in the subscanning direction in this manner makes it possible to reduce image quality degradation due to scaling as compared with the case of applying the digital scaling to the scaling in the subscanning direction.

On the other hand, to extract the security additional information embedded in the source document at a time of scaling copying, it is desirable to use (full-scale) digital image data without being scaled up or down as the image data for extraction. For this reason, processing of returning the image, which is scaled up or down in the subscanning direction by the optical scaling, to its full-scale (referred to as "reverse scaling processing" also) is carried out separately for extracting the security additional information.

However, if arbitrary magnification scaling is allowed in the optical scaling in the foregoing conventional technology, there is a danger of eliminating the security additional information embedded in the source document because of a calculation error involved in the reverse scaling processing for returning to the full-scale data.

Considering preventing deterioration in the image quality when carrying out the foregoing scaling, the optical scaling is preferable because it does not perform thinning out or interpolation as the digital scaling does. However, when the optical scaling is performed on a source document in which a low-visible bar code is embedded as the security additional information, it will change in accordance with a scaling factor the grid spacing in the subscanning direction in the image data acquired by performing the optical scaling. In addition, there is a possibility of eliminating dots depending on the scaling factor.

As described above, the optical scaling is more effective when scaling an ordinary source document up or down because it can reduce deterioration in image quality. However, when scaling up or down a source document in which encoded information such as security additional information is embedded, there is a possibility of being unable to make analysis or of reducing the accuracy of the analysis when reading out the encoded information from a printed matter of the source document.

SUMMARY OF THE INVENTION

Therefore an object of the present invention is to provide image processing capable of controlling the analysis of the encoded information embedded in a source document more accurately when performing scaling using an image reading device capable of optical scaling.

An image processing apparatus in accordance with the present invention which receives an image from an image reading device capable of optical scaling comprises: a digital scaling component configured to carry out digital scaling of the received image; and a detecting component configured to detect encoded information from the received image. Unless a scaling factor is one that will not cause any calculation error when returning an image having undergone optical scaling to a full-scale image, the digital scaling component carries out the digital scaling of the received image instead of the optical scaling; and the detecting component detects the encoded information from the received image before the digital scaling component carries out the digital scaling of the received image.

An image processing apparatus in accordance with the present invention which receives an image from an image reading device capable of optical scaling comprises: an acquiring component configured to acquire a set scaling factor; a deciding component configured to make a decision as to whether the received image includes encoded information or not; a digital scaling component configured to carry out digital scaling of the received image; a detecting component configured to detect encoded information from the received image; an optical scaling instruction component configured to instruct the image reading device to execute optical scaling processing when the deciding component decides that the received image includes the encoded information, and when the scaling factor acquired by the acquiring component is a scaling factor that will not cause any calculation error when returning an image having undergone optical scaling to a full-scale image, again; and a full-scale reading instruction component configured to instruct the image reading device to execute full-scale reading operation rather than optical scaling processing when the deciding component decides that the received image includes the encoded information, and when the scaling factor acquired by the acquiring component is a scaling factor other than scaling factors that will not cause any calculation error when returning the image having undergone optical scaling to a full-scale image, again. When receiving from the image reading device an image the image reading device acquires in accordance with the reading instruction from the full-scale reading instruction component, the detecting component detects the encoded information from the image acquired; and the digital scaling component carries out digital scaling of the image acquired.

A control method of an image processing apparatus in accordance with the present invention, which receives an image from an image reading device capable of optical scaling, comprises the steps of: acquiring a set scaling factor; making a decision as to whether the received image includes encoded information or not; instructing the image reading device to execute optical scaling processing when the step of making a decision decides that the received image includes the encoded information, and when the scaling factor acquired in the step of acquiring is a scaling factor that will not cause any calculation error when returning an image having undergone optical scaling to a full-scale image, again; instructing the image reading device to execute full-scale reading operation rather than optical scaling processing when the step of making a decision decides that the received image includes the encoded information, and when the scaling factor acquired in the step of acquiring is a scaling factor other than scaling factors that will not cause any calculation error when returning an image having undergone optical scaling to a full-scale image, again; receiving from the image reading device an image the image reading device acquires in accordance with the reading instruction issued at the step of instructing the image reading device to execute full-scale reading; detecting the encoded information from the image acquired; and carrying out digital scaling of the image acquired.

A digitally scalable image processing apparatus in accordance with the present invention, which receives an image from an image reading device capable of optical scaling, comprises: a digital scaling component configured to carry out digital scaling of the received image; and a detecting component configured to detect encoded information from the received image. Unless a scaling factor is one that will not cause any calculation error when returning an image having undergone optical scaling to a full-scale image, the digital scaling component carries out the digital scaling of the received image instead of the optical scaling; and the detecting component detects the encoded information from the received image before the digital scaling component carries out the digital scaling of the received image.

According to the present invention, it becomes possible to extract encoded information reliably such as security additional information embedded in the source document even at scaling copying.

Further features of the present invention will become apparent from the following description of exemplary embodiments (with reference to the attached drawings).

DESCRIPTION OF THE EMBODIMENT

Figure 1:
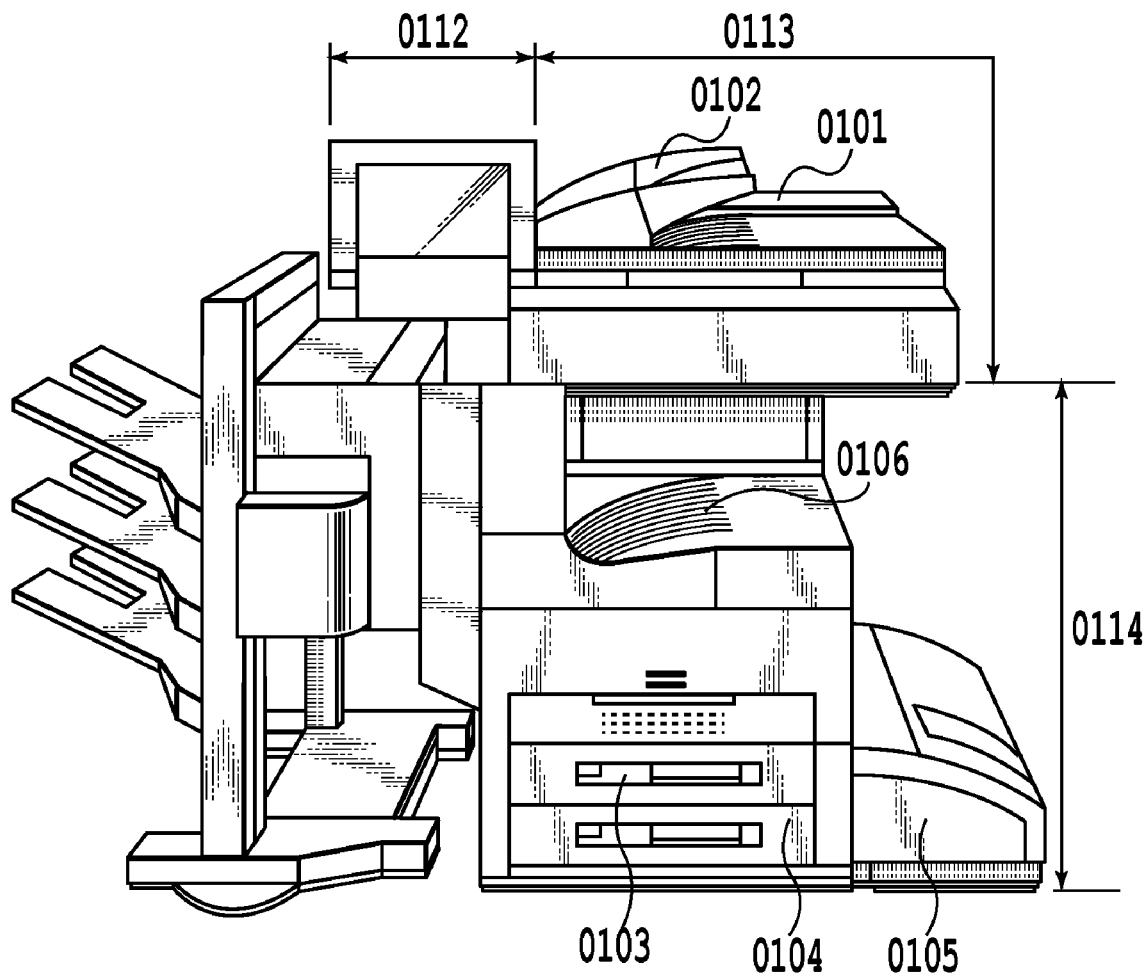
FIG. 1 is a general perspective view of an image forming device of an embodiment in accordance with the present invention.

The embodiment in accordance with the invention will now be described in detail with reference to the accompanying drawings. In the drawings described below, components having the same functions are designated by the same reference numerals, and their duplicate description will be omitted.

In accordance with the present invention, when scanning a source document on which encoded information such as security additional information is printed while enlarging or reducing it, the scaling factor is restrained of the so-called optical scaling which carries out scaling by changing the scanning speed of the source document. This makes it possible to perform reliable decoding of the encoded information such as security additional information embedded in the source document.

<External Appearance of Image Forming Device>

FIG. 1 is a perspective view of an image forming device of the present embodiment.

A scanner unit 0113 serving as an image reading device supplies the reflected light obtained by exposure-scanning an image on a source document to a photosensitive element such as a CCD (Charge Coupled Device) or CIS (Contact Image Sensor). Thus information on the image is converted to an electrical signal. The scanner unit 0113 further converts the electrical signal to luminance signals consisting of R, G and B colors, and outputs the luminance signals as image data. The scanner unit 0113 is constructed in such a manner that it can perform optical scaling.

Source documents are set on a tray 0102 of a document feeder 0101. When a user instructs from a console 0112 to start reading, the scanner unit 0113 receives a source document reading instruction. Receiving the instruction, the scanner unit 0113 feeds the source documents one by one from the tray 0102 of the document feeder 0101 and carries out reading operation of the source documents. As for the reading operation of the source document, it is not limited to the automatic feeding method by the document feeder 0101, but a method is also possible which places the source document on a document glass (not shown) and moves an exposure unit.

A printer unit 0114 is the image forming device for forming the foregoing image data on paper. In the present embodiment, although the image forming system employs electrophotography using a photoconductive drum or photoconductive belt, the present invention is not limited to it. For example, an ink-jet system that prints on paper by expelling inks from minute nozzle arrays is also applicable. The printer unit 0114 is loaded with a plurality of paper cassettes 0103, 0104 and 0105 to enable selecting different paper size and different paper directions. To a paper output tray 0106, paper after printing is ejected.

<Block Diagram of System Installed in Image Forming Device>

Figure 2:
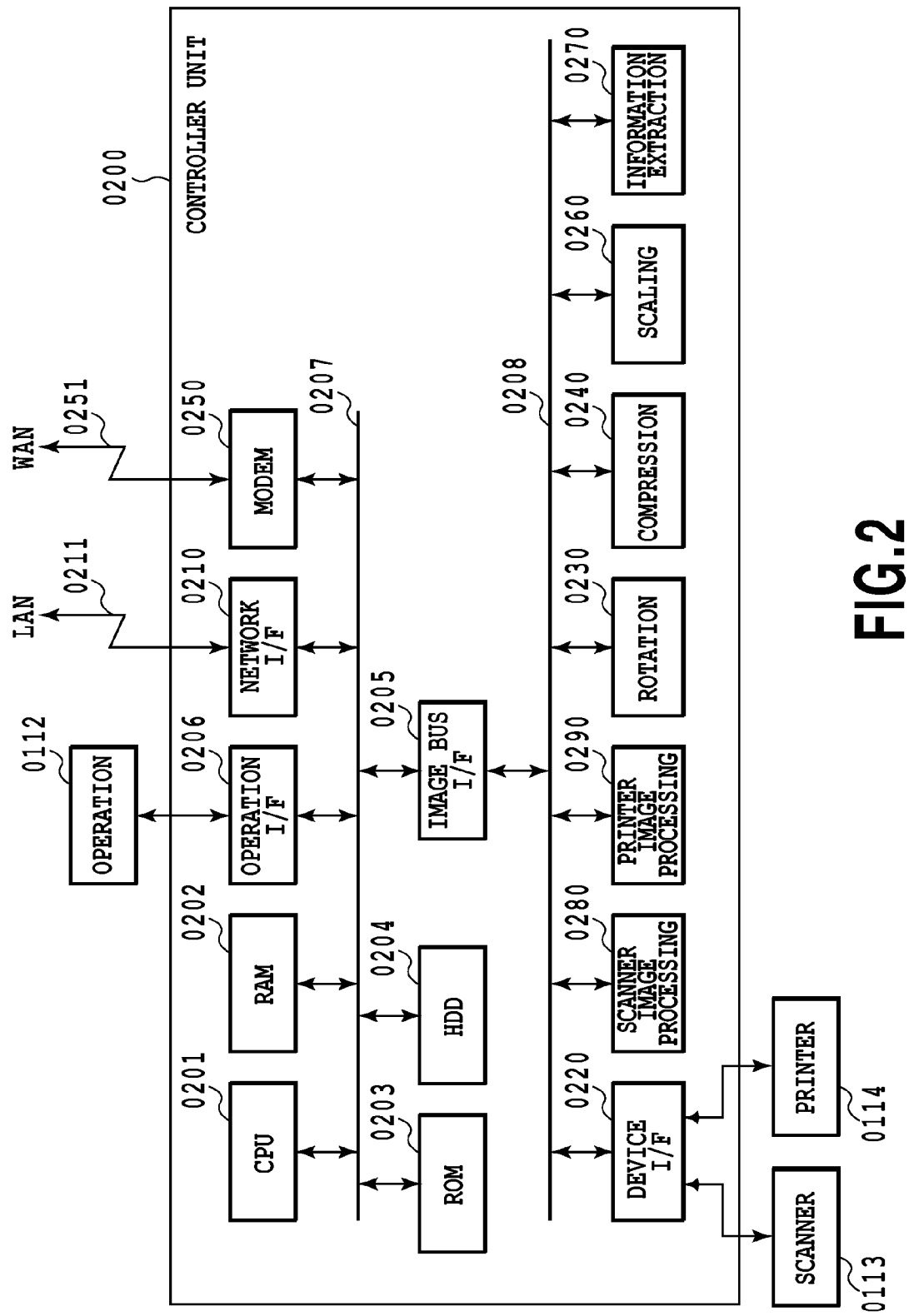
FIG. 2 is a system block diagram of the principal part of the image forming device of the embodiment in accordance with the present invention.

FIG. 2 is a block diagram showing a system configuration in the present embodiment. The system is installed in the image forming device shown in FIG. 1.

A controller unit 0200 is connected to the scanner 0113 serving as an image input device or to the printer 0114 serving as an image output device. On the other hand, the controller unit 0200 is connected to a LAN 0211 or public network (WAN) 0251 so that it performs input and output of information such as image information and device information from and to external equipment such as a PC.

A CPU 0201 is a controller for controlling the entire system and various processing executed within the controller unit 0200 collectively in accordance with programs and the like stored in a ROM or hard disk. A RAM 0202 is a system work memory for the CPU 0201 to operate, and also an image memory for temporarily storing the image data. A ROM 0203 is a boot ROM for storing a boot program of the system. An HDD 0204 is a hard disk drive for storing system software and image data. In the present embodiment, the CPU 0201 executes processing operations such as various calculations, control, decisions and the like in accordance with the control program of the processing of the present embodiment stored in the ROM 0203 or HDD 0204.

A console I/F 0206, which is an interface unit with a console (UI) 0112 having a touch panel, outputs the image data to be displayed on the console 0112 to the console 0112. In addition, it plays a role of transferring information a user of the system inputs from the console 0112 to the CPU 0201. A network I/F 0210, which is connected to the LAN 0211, performs input and output of information. A modem 0250, which is connected to the public network 0251, carries out input and output of the information. The foregoing devices are placed on a system bus 0207.

An image bus I/F 0205, which connects an image bus 0208 for transferring the image data at a high speed to the system bus 0207, is a bus bridge for converting a data structure. The image bus 0208 can be composed of a PCI bus or IEEE 1394. The following devices are placed on the image bus 0208.

A device I/F unit 0220, which connects the scanner 0113 serving as the image input device and the printer 0114 serving as the image output device to the controller unit 0200, carries out synchronous/asynchronous system conversion of the image data. A scanner image processing unit 0280 performs correction, processing and editing of the input image data. A printer image processing unit 0290 performs correction of the printer for printout image data. An image rotating unit 0230 carries out rotation of the image data. An image compression unit 0240 performs compression/decompression processing of multivalued image data to JPEG, and binary image data to JBIG, MMR or MH. An image scaling unit 0260 carries out digital scaling of the image data. The image scaling unit 260 makes it possible to realize a configuration capable of carrying out the digital scaling. An information extraction unit 0270 extracts the encoded information such as the security additional information from the image data received from the scanner unit 0113.

The encoded information is information created by encoding information such as the security additional information, and includes one-dimensional code and two-dimensional code. As an example of the encoded information, there is a digital watermark, one-dimensional bar code, two-dimensional bar code, or low visibility bar codes (LVBC). In the present embodiment, an example will be described which employs the security additional information, particularly information encoded in terms of the LVBC, as the encoded information.

Incidentally, the term "digital scaling" in the present specification refers to the scaling processing carried out by the image processing such as thinning out and interpolation of the image data acquired by reading from the image reading device like a scanner.

In addition, the term "optical scaling" in the present specification refers to the scaling processing that realizes scaling in the subscanning direction by varying the scanning speed in the subscanning direction of the source document in accordance with the set scaling factor when reading with the image reading device like a scanner.

One of the features of the present invention is to restrict the execution of the optical scaling processing with the exception of prescribed magnification when carrying out scaling using the image reading device having the optical scaling processing function that performs the optical scaling processing by controlling the scanning speed of the source document in accordance with the scaling factor (magnification). Thus, the present invention is characterized by using one of the optical scaling, the digital scaling and the combination of the digital scaling and optical scaling for different cases (for different scaling factors) in the scaling in the subscanning direction of the source document.

<Setting of Scaling Copying>

Figure 3:
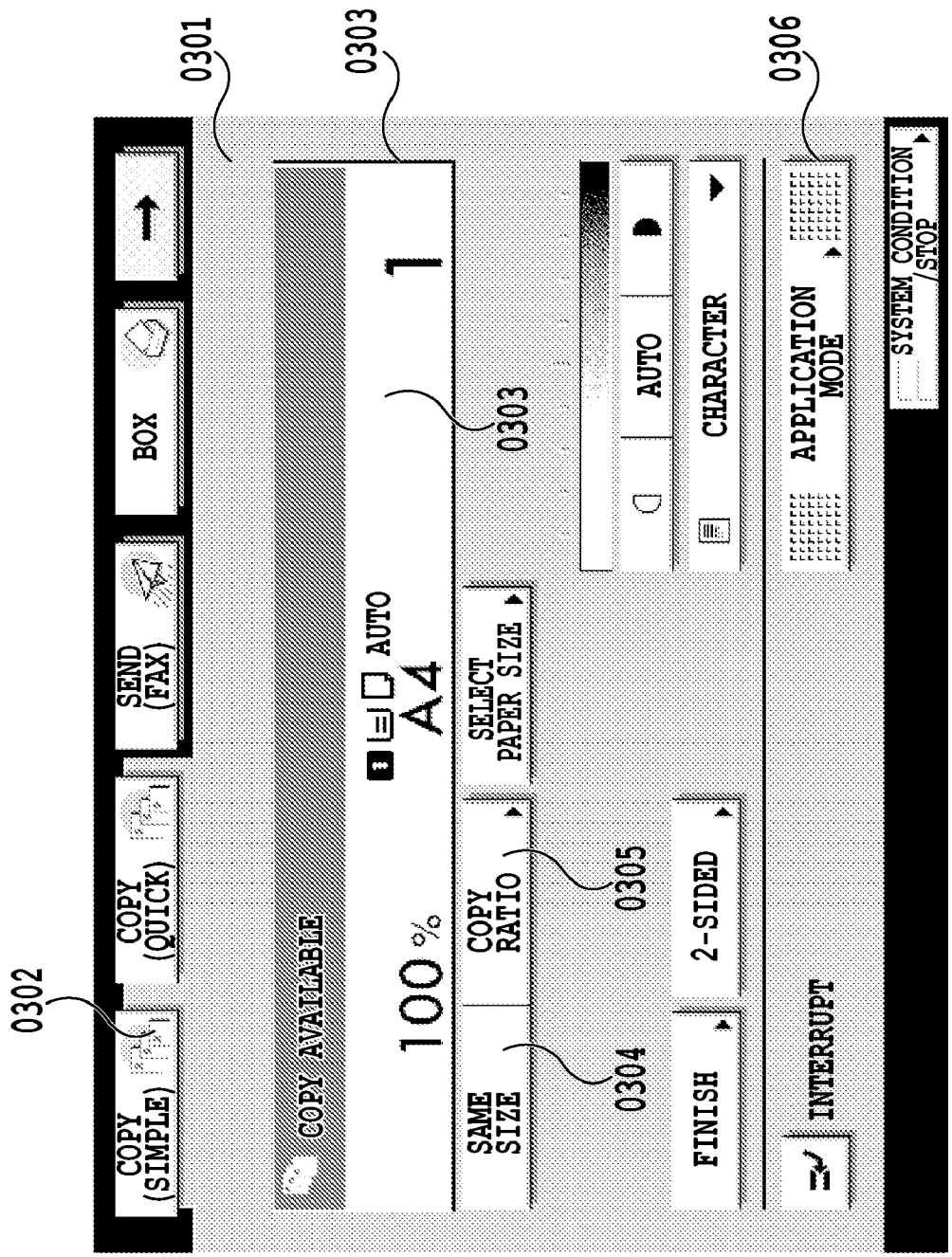
FIG. 3 is a view showing a GUI the image forming device of the embodiment in accordance with the present invention has, which shows a state in which the GUI displays an ordinary copying screen.
Figure 4:
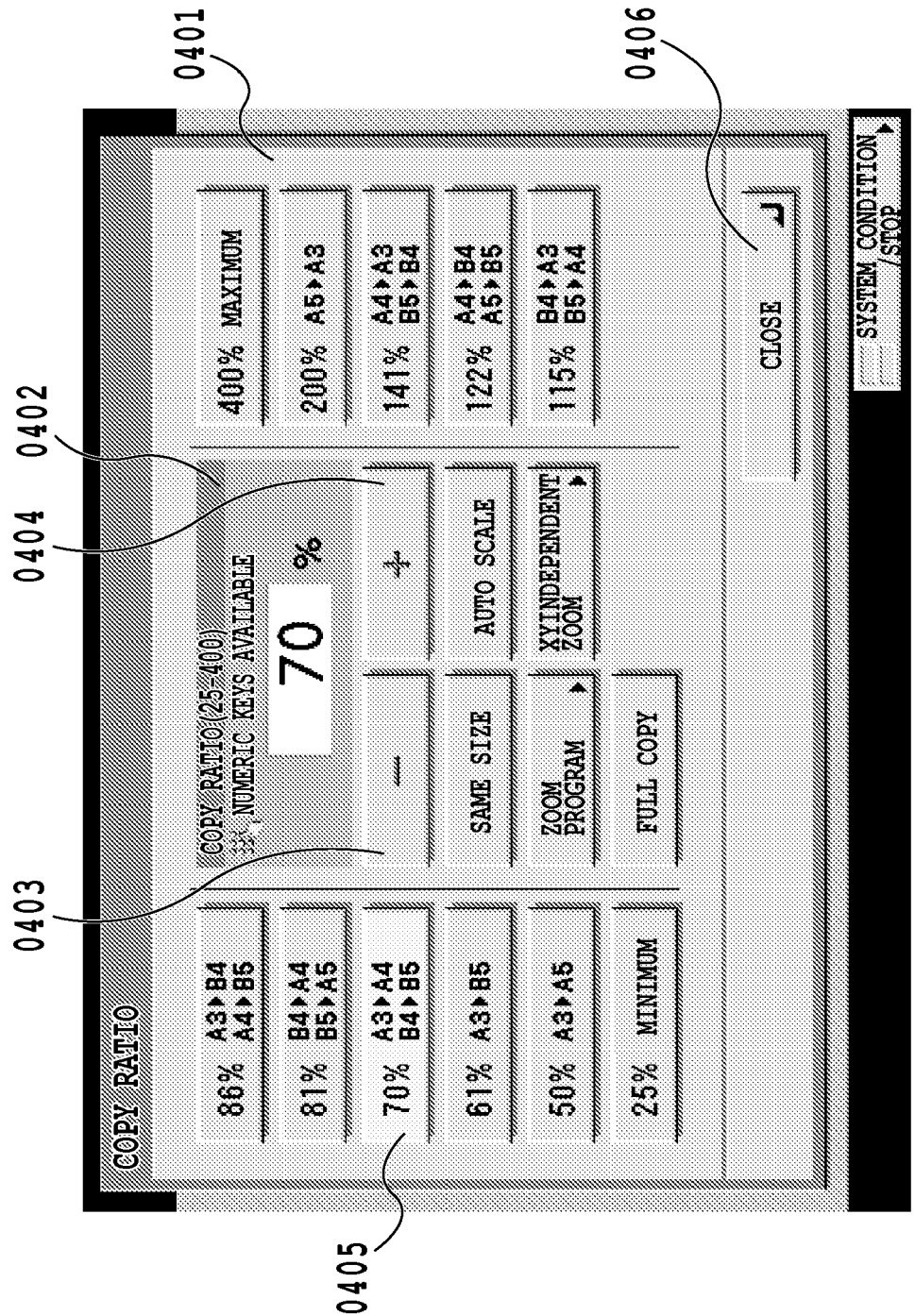
FIG. 4 is a view showing a GUI the image forming device of the embodiment in accordance with the present invention has, which shows a state in which the GUI displays a screen for setting scaling.

Referring to FIG. 3 and FIG. 4, setting of the scaling copying in the present embodiment will be described.

FIG. 3 is a view showing a GUI the image forming device of the present embodiment has, which shows a state in which the GUI displays an ordinary copying screen. The GUI shown in FIG. 3 is displayed on the console 0112. The reference numeral 0301 designates the screen of the UI (User Interface), and the reference numeral 0302 designates a copying tab indicating that copying is selected. The reference numeral 0303 designates a display condition window for showing settings of the copying. The display condition window 303 displays the magnification set, paper size selected, and the number of copies. The reference numeral 0304 designates a button to be selected when carrying out full-scale (100%) copying. The reference numeral 0305 designates a button for setting the magnification when carrying out scaling copying. The reference numeral 0306 designates an application mode button to be pushed down when setting an application mode. When the scaling button 0305 is pushed down, the GUI screen for carrying out the scaling setting shown in FIG. 4 is displayed on the console 0112.

In FIG. 4, the reference numeral 0401 designates a screen for carrying out the scaling setting. A display condition window 402 shows the set scaling factor which is 70% in FIG. 4. When a reduction scaling button 0403 is pushed down, the scaling factor reduces at 1% steps, and when an enlargement scaling button 0404 is pushed down, the scaling factor increases at 1% steps. A plurality of buttons for carrying out the reduction or enlargement copying setting at a fixed magnification is displayed on the screen 0401. For example, when a reduction button 0405 is pushed down, the reduction copying from an A3 source document to A4 paper (or from a B4 source document to B5 paper) is selected so that 70% reduction copying setting can be performed simply without pushing the reduction scaling button 0403 many times. When a button 0406 is pushed down, the screen 0401 for carrying out the scaling setting is closed, and the copying screen 0301 shown in FIG. 3 appears.

<Scaling Copying Operation>

Figure 5:
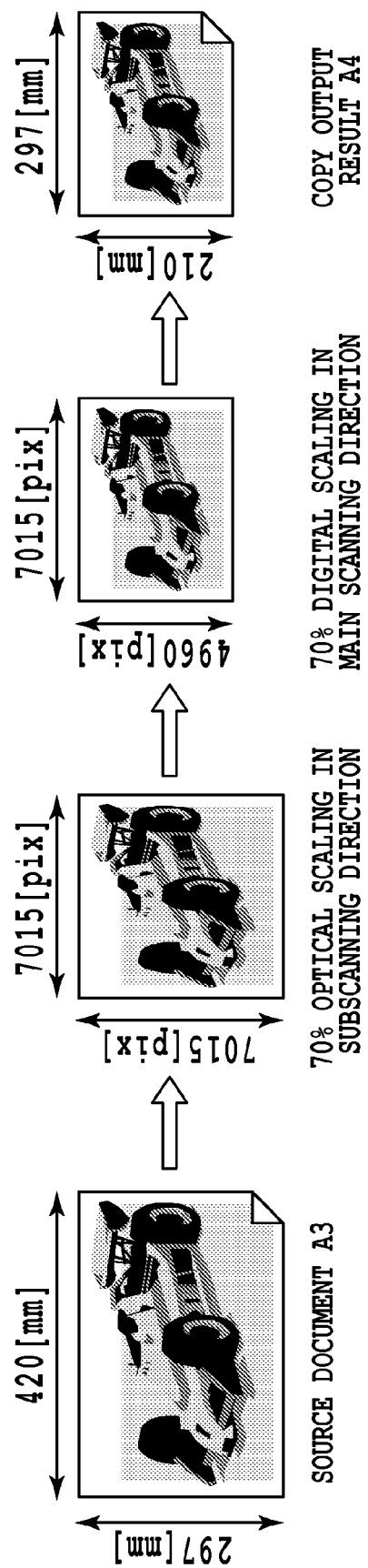
FIG. 5 is a view for explaining an operation flow of scaling copying of the embodiment in accordance with the present invention.

Referring to FIG. 5, the operation of the image forming device when carrying out optical scaling copying of an A3 size source document to A4 size paper will be described.

The reference numeral 501 designates source document paper of A3 size (297 mm in length (main scanning direction)×420 mm in width (subscanning direction)) to be copied from now. To carry out the optical scaling copying of the A3 size source document 501 to A4 size paper, the user pushes down the 70% reduction button 0405 on the screen for scaling setting described in the foregoing FIG. 4 via the console 0112. In response to the pushing, the controller unit 0200 receives the information indicating that the optical scaling copying is to be performed.

Next, setting the A3 size source document 501 on the tray 0102 of the document feeder 0101, the user instructs the controller unit 0200 to start reading from the console 0112. Then the controller unit 0200 receives the instruction and gives the scanner unit 0113 the source document reading instruction. Receiving the instruction, the scanner unit 0113 feeds the source document and carries out reading operation of the source document. In this case, however, since the 70% reduction copy is set by the optical scaling, the reading operation is performed at 142% of the feed speed at the full-scale copying.

As a result, image data 502 is obtained which undergoes 70% optical scaling only in the subscanning direction and has 7015 [pixels] in length×7015 [pixels] in width, and the data 502 is stored in the RAM 0202. Next, 70% digital scaling of the stored image data 502 is performed in the main scanning direction using the image scaling unit 0260. As a result, image data 503 is obtained which undergoes scaling in the main scanning direction and has 4960 [pixels] in length×7015 [pixels] in width, and the data 503 is stored in the RAM 0202. The data 503 is delivered to the printer unit 0114 to be printed on paper. As a result, A4 size copy output result 504 is obtained.

<Extraction Setting of Security Additional Information>

Figure 11:
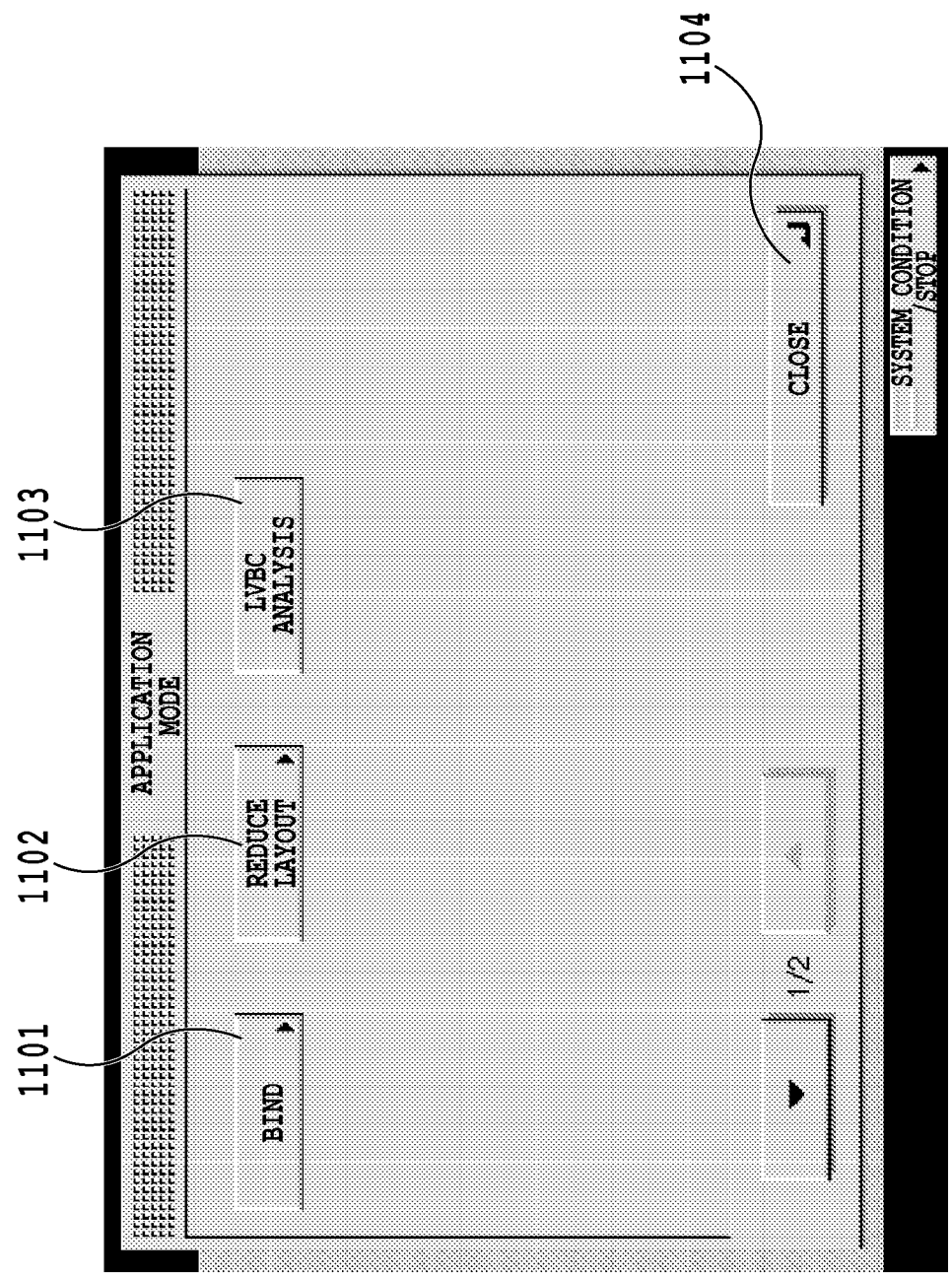
FIG. 11 is a view showing a GUI the image forming device of the embodiment in accordance with the present invention has, which shows a state in which the GUI displays a screen for analysis settings of an LVBC as encoded information.

Referring to FIG. 11, the copying setting will be described in the case of extracting an embedded content from the source document in which LVBC (Low Visibility Bar Codes) are embedded as the security additional information.

FIG. 11 shows an application mode setting screen displayed on the console 0112 when the application mode button 0306 is pressed in the foregoing FIG. 3. On the screen of FIG. 11, are placed a setting button 1101 for carrying out bookbinding copying, a setting button 1102 for carrying out reduction layout copying, a button 1103 for carrying out copying while analyzing the LVBC embedded in the source document, and the like. When analyzing the LVBC at the copying, pushing down the button 1103 can make the setting. When the user pushes down the button 1103 via the console 0112, the controller unit 0200 receives the information indicating that the LVBC analysis is to be performed at the copying. When the user pushes down a closing button 1104 at the time of completing the setting, the screen of FIG. 11 disappears and a copying screen 0301 shown in FIG. 3 appears.

<Operation for Extracting Security Additional Information at Scaling Copying>

Figure 6:
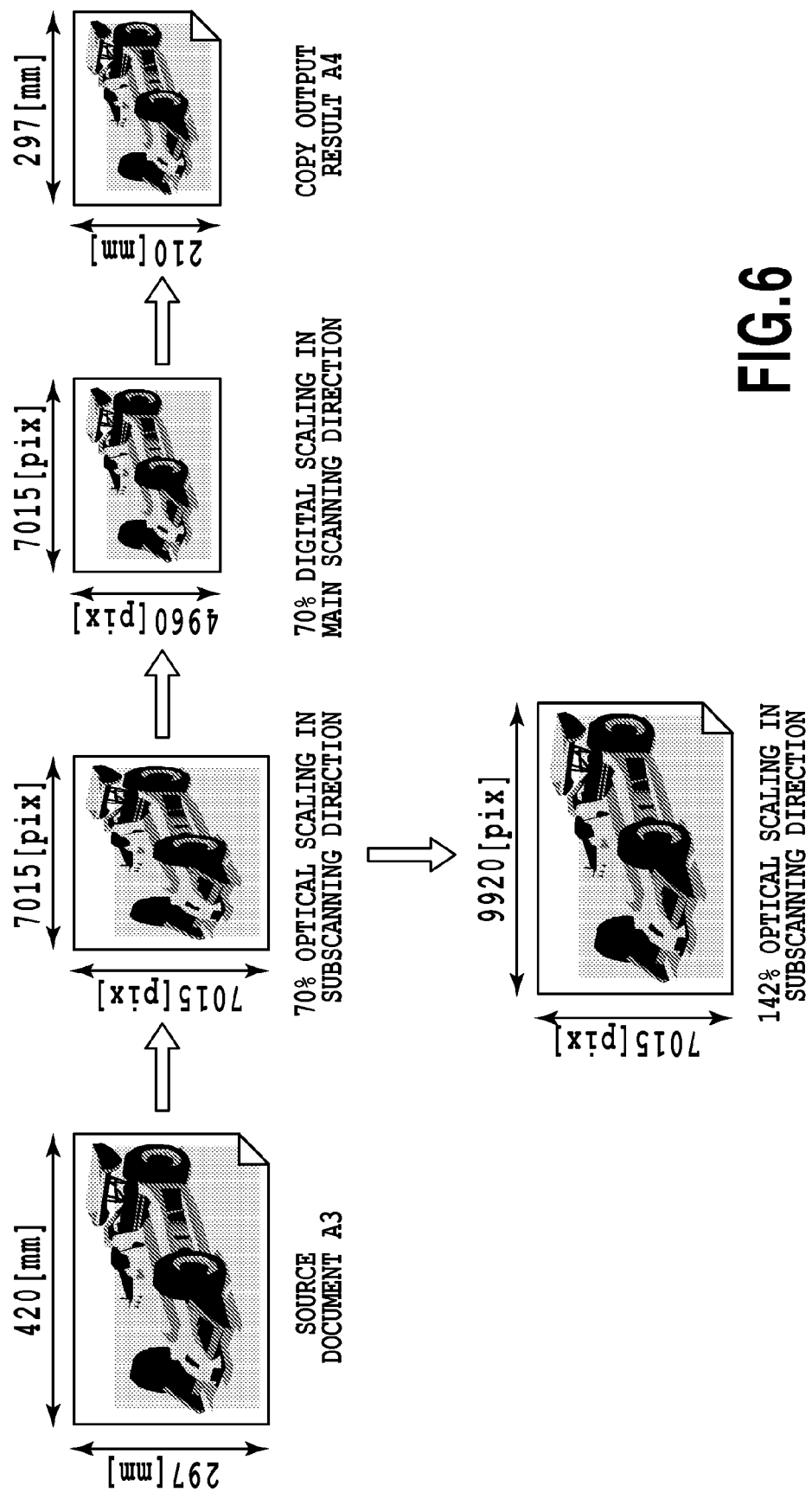
FIG. 6 is a view for explaining an operation flow when performing conventional scaling copying and encoded information extraction simultaneously.

Referring to FIG. 6, a conventional method will be described of executing optical scaling copying while extracting the security additional information. FIG. 6 differs from FIG. 5 in that LVBC are embedded in the entire surface of the source document as the security additional information, and that an image 605 for LVBC extraction is created. The other optical scaling copying setting values and the like are identical.

While carrying out the scaling copying of the A3 size source document 601 in which the security additional information is embedded to the A4 size paper, the following reverse scaling processing is simultaneously performed to extract the security additional information. More specifically, image data 602 is created by carrying out the optical scaling at a scaling factor of 70% in the subscanning direction of the A3 size source document 601. Subsequently, as for the image data 602 reduced by 70% in the subscanning direction by the optical scaling, the image scaling unit 0260 performs enlargement digital scaling processing (reverse scaling processing) of 142% in the subscanning direction. As a result, image data 605 is obtained with the size approximately equal to the image data obtained by the full-scale scanning in the main scanning direction and subscanning direction. The information extraction unit 0270 extracts the security additional information from the image data 605.

Incidentally, in the present specification, the term "reverse scaling processing" refers to processing of enlarging (reducing) the image data reduced (enlarged) by the scaling at a prescribed ratio to the original size.

Figure 7A:
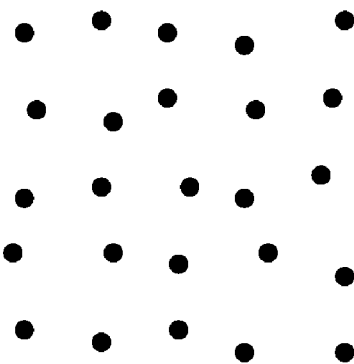
FIG. 7A is a diagram for explaining LVBC printed on a source document of the embodiment in accordance with the present invention.
Figure 7B:
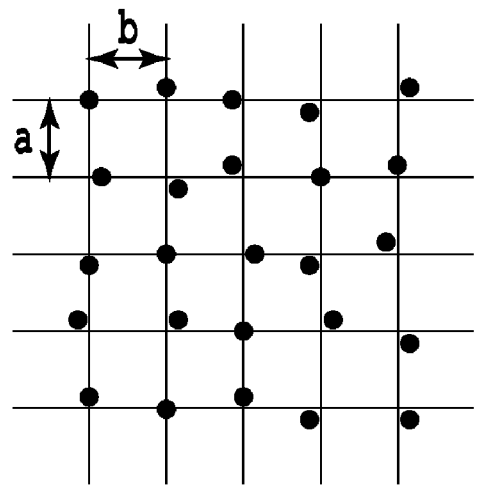
FIG. 7B is a diagram for explaining a virtual grid of the embodiment in accordance with the present invention.

However, even if performing the enlargement scaling processing of 142% on the image data 602 that once undergoes reduction to 70% as in the foregoing procedure, it does not become exactly the same size as the full-scale scanned image data because of the calculation error. Accordingly, if the information extraction unit 0270 extracts the security additional information using the image data 605 that undergoes the reverse scaling processing by the digital scaling, there is a possibility of being unable to extract the information correctly because of the following reason. As shown in FIG. 7A, to achieve the dot analysis of the LVBC embedded in the source document, the displacement is measured of the coordinates of actually marked dots from the points of a virtual grid as shown in FIG. 7B, and the displacement is converted to data. Accordingly, unless the spacings a and b of the grid in FIG. 7B are equal, the analysis cannot be conducted.

For this reason, the present invention controls in such a manner as to extract the security additional information reliably by restraining the scaling factor for carrying out the optical scaling at the scaling copying. More specifically, when extracting the security additional information and scaling simultaneously, if the scaling factor at the scaling is such a one as would cause a calculation error if the reverse scaling processing is performed on the image data that undergoes the optical scaling at that scaling factor, the control is carried out in such a manner as to halt the optical scaling according to the scaling factor, but to perform the digital scaling. Thus, unless the predetermined scaling factor is a scaling factor suitable for the optical scaling, that is, a scaling factor that will not cause any calculation error when returning the image that undergoes the optical scaling to the full-scale image, the control is performed in such a manner as to carry out the digital scaling instead of the optical scaling.

The scaling factor that will not cause any calculation error is also referred to as "scaling factor suitable for optical scaling".

The scaling factors suitable for optical scaling will be described in more detail. Generally, in the digital scaling, when the magnification is (100/N) % or N×100% such as 25%, 50%, 200% and 300% (N is a natural number equal to one or more), that is, when the magnification that will not cause any calculation error, simple scaling is performed, but for the other magnification, pixel interpolation scaling (such as bilinear scaling) is carried out. In the present embodiment, if the reverse scaling processing can be carried out using the simple scaling, the image data after the reverse scaling processing is free from influence of the calculation error. Thus, even if the optical scaling is performed, no distortion or the like because of the calculation error will arise as to the image data after the reverse scaling processing. Accordingly, the scaling factors enabling the simple scaling such as 25%, 50%, 200%, 300% and so on are the scaling factors suitable for optical scaling.

Incidentally, as for the scaling factors requiring such control as carrying out the digital scaling rather than the optical scaling, they can be scaling factors other than part of the scaling factors suitable for optical scaling. In other words, it is also possible to carry out the optical scaling for prescribed scaling factors in the scaling factors suitable for optical scaling, and to perform the digital scaling instead of the optical scaling for those other than the prescribed scaling factors (embodiment of FIGS. 9 and 10 which will be described later). Alternatively, it is also possible to carry out the optical scaling for all the scaling factors suitable for optical scaling within the specifications of the scanner unit, and to perform the digital scaling instead of the optical scaling for the scaling factors other than the scaling factors suitable for optical scaling.

Thus, the present invention controls in such a manner as to carry out the digital scaling rather than the optical scaling when performing the scaling at a scaling factor other than at least one of the scaling factors suitable for optical scaling.

Figure 8:
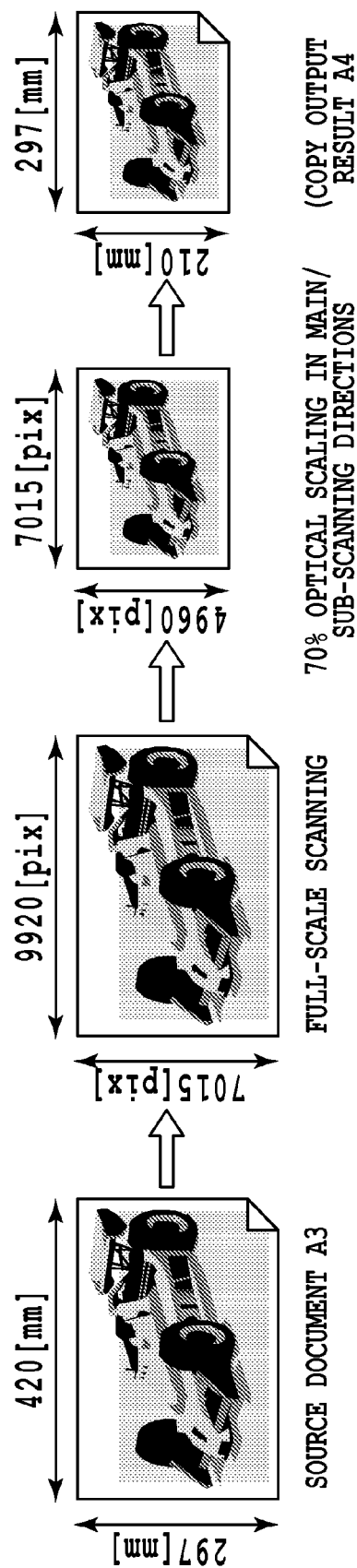
FIG. 8 is a view for explaining an operation flow when performing scaling copying and encoded information extraction simultaneously considering a calculation error in the embodiment in accordance with the present invention.

For example, when carrying out the foregoing scaling copying from an A3 size source document to A4 size paper, the scaling processing is performed as shown in FIG. 8. To be more concrete, if the CPU 0201 makes a decision that the scaling factor input by the user via the console 0112 is other than the scaling factors suitable for optical scaling, it can carry out the full-scale processing instead of the optical scaling processing. More specifically, as for the scanning of the A3 size source document paper 801 to be copied from now, the full-scale scanning is performed in FIG. 8 in contrast with the optical scaling in FIG. 6, which conducts 70% scaling in the subscanning direction. As a result, 7015 [pixels] long× 9920 [pixels] wide image data 802 which are not subjected to the scaling is obtained. Next, the CPU 0201 performs 70% digital scaling on the image data 802 in both the main scanning direction and subscanning direction using the image scaling unit 0260. After the scaling, the CPU 0201 delivers the 4960 [pixels] long×7015 [pixels] wide image data 803 to the printer unit 0114 to be printed on paper, and an A4 size copy output result 804 is obtained.

The extraction of the security additional information is performed from the full-scale scanned image data 802 using the information extraction unit 0270. In the present embodiment, since the security additional information is extracted from the full-scale scanned image data 802, the extraction error resulting from the image distortion due to the calculation error as described above with reference to FIG. 6 does not occur. In addition, since the information extraction unit 0270 is disposed in parallel with the image scaling unit 0260 as shown in FIG. 2, it becomes possible to extract the security additional information from the image data 802 immediately after the scanning before the digital scaling processing.

Incidentally, there is a scaling factor that will cause a calculation error at the time of performing the reverse scaling processing (digital scaling) of the image data after the optical scaling as in the conventional technology as shown in FIG. 6, that is, when returning it to the full-scale image data. To carry out the reverse scaling at such a scaling factor, it is necessary to perform pixel interpolation scaling. As for the scaling factor that will cause the calculation error, if the pixel interpolation scaling is used to return to the full-scale image data, there are some cases where gray level difference will occur between the images after and before returning to the full-scale image. In other words, as for the scaling factors other than the scaling factors suitable for optical scaling, which are the magnification enabling the simple scaling, although it is necessary to carry out the pixel interpolation scaling at the reverse scaling, the difference in the gray level variations occurs because of the pixel interpolation scaling. Although such gray level variations do not present any problem when the security additional information is not extracted, there is a possibility of preventing accurate extraction when the gray level variations occur at the extraction of the security additional information. For this reason, in the present embodiment, when the extraction of the security additional information is set and the scaling factor other than the scaling factors suitable for optical scaling is determined, the full-scale scanning is carried out once without the optical scaling processing, and the extraction of the security additional information is performed from the full-scale scanned image, followed by performing the digital scaling to achieve the prescribed magnification.

Figure 9:
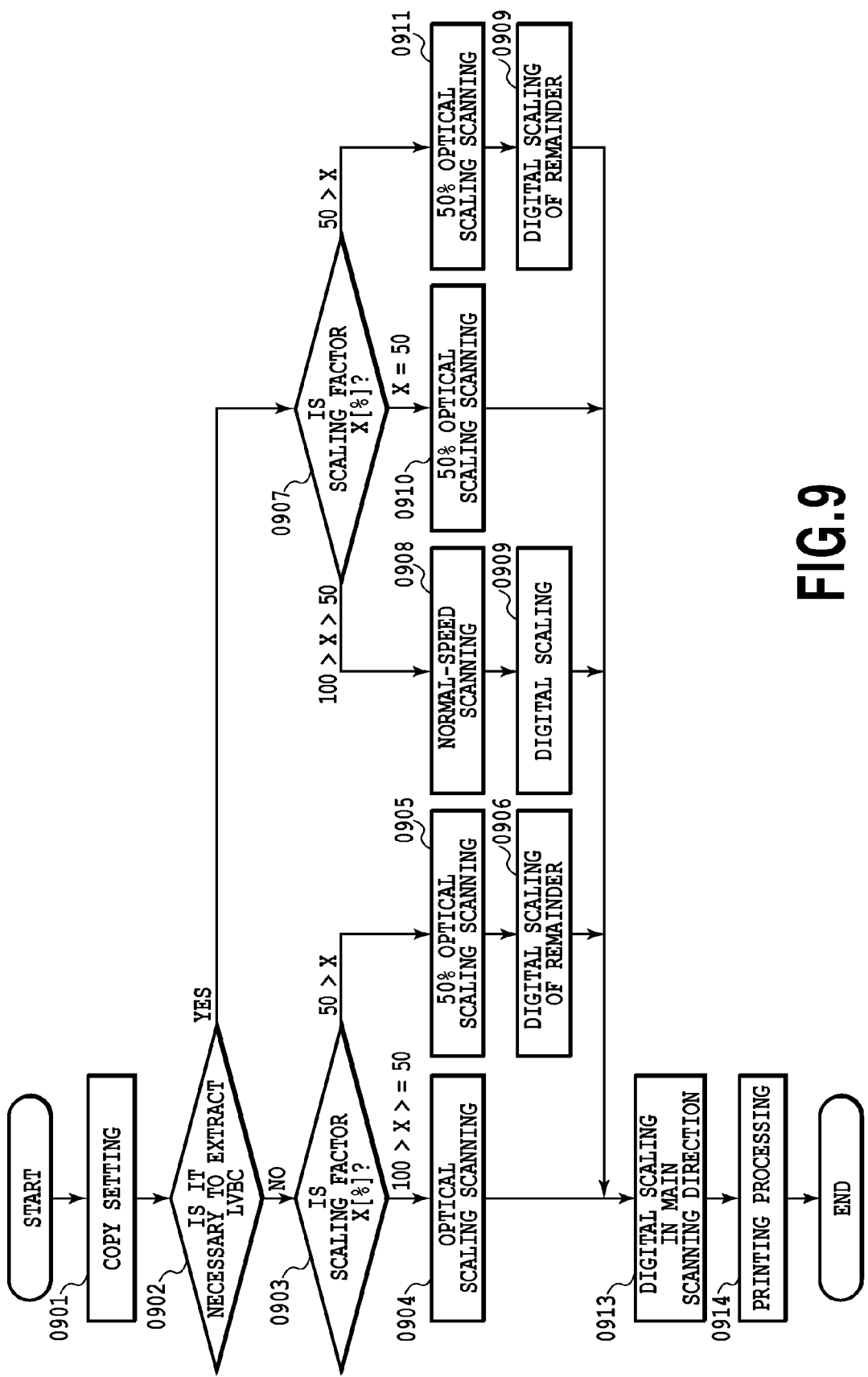
FIG. 9 is a flowchart showing a flow of optical scaling processing and digital scaling processing of the embodiment in accordance with the present invention when a scaling factor less than 100% is set.
Figure 10:
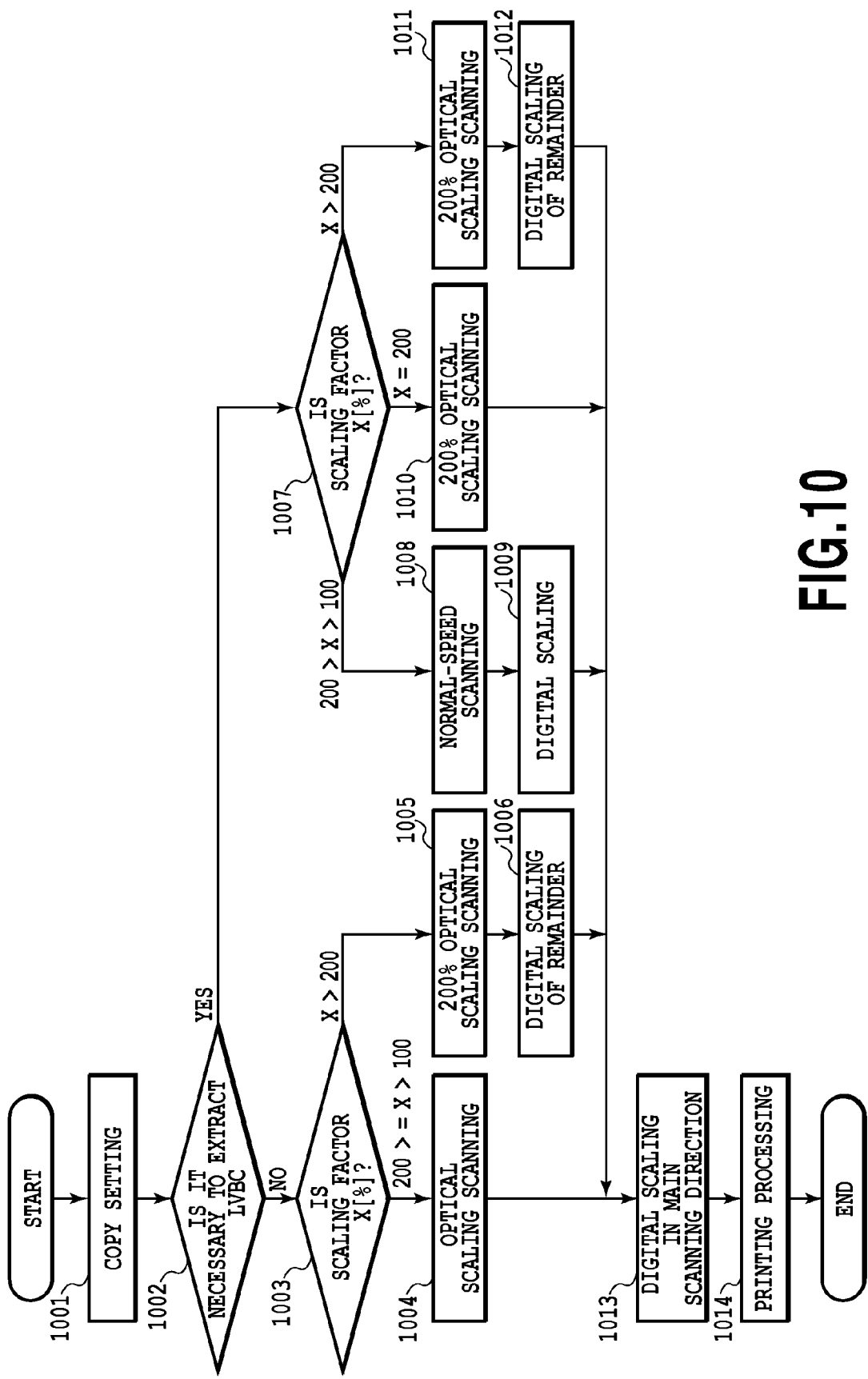
FIG. 10 is a flowchart showing a flow of the optical scaling processing and digital scaling processing of the embodiment in accordance with the present invention when a scaling factor greater than 100% is set.

The operation steps described above with reference to FIG. 8 are put together to flowcharts shown in FIG. 9 and FIG. 10, which show how to execute the scaling in the subscanning direction by combining the optical scaling and digital scaling when using the scanner 0113 capable of performing the optical scaling from 50% to 200%. FIG. 9 is a flowchart showing the optical scaling processing and the digital scaling processing when the scaling copying less than 100% is set; and FIG. 10 is a flowchart showing the optical scaling processing and the digital scaling processing when the scaling copying greater than 100% is set.

In the foregoing description, as for the enlargement processing greater than 200% or the reduction processing less than 50%, it is assumed that the optical scaling processing cannot be carried out from the view point of the specifications of the scanner 0113. In other words, it is assumed that the limit of the optical scaling factor of the scanner 0113 is 50% in the reduction direction and 200% in the enlargement direction.

Although the foregoing 50% and 200% are scaling factors suitable for optical scaling, other values such as 25% and 300% are also scaling factors suitable for optical scaling. In other words, in the reduction direction, (100/N) % (N is an integer except for zero) a rescaling factors suitable for optical scaling, and in the enlargement direction, N×100% are. However, although the optical scaling can give more orderly scanned results than the digital scaling, it sometimes becomes difficult depending on the scaling factor. For example, if the magnification is 1%, it is necessary to scan at a speed 100 times faster than the full-scale scanning, and the control for operating the scanner at such a high speed is very difficult. In addition, if the magnification is 10000, although it is necessary to operate the scanner at a speed 1/100 times the full-scale scanning rate, the control of operating the scanner at such a low speed is also difficult.

Thus, the present embodiment sets the scaling factor 50% as the limit in the reduction direction of the optical scaling and the scaling factor 200% as the limit in the enlargement direction. Then the digital scaling is carried out instead of the optical scaling when the extraction of the security information is set, and if the scaling factor is greater than 50% and less than 100% or greater than 100% and less than 200%. In contrast, the optical scaling is carried out when the extraction of the security information is set, and if the scaling factor is 50% or 200% which is part of the scaling factors suitable for optical scaling. Furthermore, combination processing which will be described later is carried out when the extraction of the security information is set, and if the scaling factor is less than 50% or greater than 200%.

In FIG. 9, at step 0901 first, the CPU 0201 carries out scaling copying setting or extraction setting of the security additional information as copying setting. Concrete operations are exactly the same as described above with reference to FIG. 3 and FIG. 4, and FIG. 11, and the setting at step 0901 is transmitted to the CPU 0201 via the console I/F 0206 and is stored in the RAM 0202. At step 901, the CPU 0201 further extracts a set scaling factor X from the information on the scaling copying setting extracted, and stores it in the RAM 0202.

Next, at step 0902, the CPU 0201 makes a decision as to whether it is necessary to extract the security additional information (LVBC) according to the information extracted at step 0901. In other words, the CPU 0201 makes a decision as to whether the image it receives from the scanner 0113 includes the LVBC or not according to the information extracted. The decision is made depending on whether or not the LVBC analysis button 1103 has been pushed down in the application mode described in FIG. 11. Unless the LVBC analysis is set, the processing proceeds to step 0903.

At step 0903, the CPU 0201 makes a decision as to what percentage the scaling factor X is which is stored in the RAM 0202 (set by the user) at step 0901. As a result of the decision, if the set scaling factor X is less than 100% and is 50% or more, the processing proceeds to step 0904 to perform the scalingby the optical scaling scanning. Thus, the CPU 0201 sends to the scanner 0113 a command (instruction) to execute the optical scaling processing in such a manner as to carry out reduction at the scaling factor the user sets. The scanner 0113 executes the optical scaling processing in the subscanning direction of the source document in accordance with the command. The image data obtained by the scanning is stored in the RAM 0202 via the image bus I/F 0205. Thus, the image data stored in the RAM 0202 at this step has undergone the prescribed scaling processing in the subscanning direction.

On the other hand, if the decision is made at step 0903 that the scaling factor is less than 50%, that is, if the scaling factor is below the limit of the optical scaling, the CPU 0201 executes the combination processing of the optical scaling and digital scaling. First, at step 0905, the CPU 0201 executes the 50% reduction, the limit scaling factor of the optical scaling of the scanner 0113, and stores the data passing through the reduction in the RAM 0202 temporarily. More specifically, the CPU 0201 sends to the scanner 0113 a command to carry out the optical scaling processing in such a manner as to perform reduction at the scaling factor 50%. The scanner 0113 obtains the image data reduced to 50% in accordance with the command, and stores it in the RAM 0202. Subsequently, at step 0906, the CPU 0201 performs the digital scaling processing corresponding to the remaining reduction factor on the image data which has undergone the 50% reduction and stored in the RAM 0202 at step 0905 using the image scaling unit 0260, and stores the image data subjected to the scaling in the RAM 0202. The image data passing through steps 0905 and 0906 and stored in the RAM 0202 has undergone the prescribed scaling processing in the subscanning direction.

In this way, in the present embodiment, the CPU 0201 executes the scaling processing by combining the optical scaling processing and the digital scaling processing (referred to as "combination scaling processing" as well) when the scaling factor is less than 50%. For example, to carry out the reduction at a scaling factor of 30%, the scanner 0113 performs the 50% reduction in the subscanning direction of the source document first, to obtain the 50% reduction image data. Subsequently, the CPU 0201 carries out the digital scaling in such a manner as to perform 60% reduction on the 50% reduction image data obtained. The image data obtained through the combination scaling processing in this manner becomes 30% reduction image data with respect to the image data obtained by the full-scale scanning. As a result, the reduction at the scaling factor of 30% is achieved.

At step 0913, the CPU 0201 performs in the main scanning direction the digital scaling processing of the image data that has undergone the prescribed scaling processing in the subscanning direction and stored in the RAM 0202 by using the image scaling unit 0260. The image data after the scaling is stored in the RAM 0202. At step 0914, the CPU 0201 delivers the image data stored in the RAM 0202 at step 0913 to the printer unit 0114 to print on paper, and completes a series of the processing.

On the other hand, if the CPU 0201 makes a decision at step 0902 that it is necessary to extract the LVBC, the processing proceeds to step 0907. At step 0907, the CPU 0201 makes a decision as to what percentage the scaling factor X is which is stored in the RAM 0202 (set by the user) at step 0901. As a result of the decision, if the set scaling factor X is less than 100% and greater than 50%, the CPU 0201 proceeds to step 0908 to perform normal-speed scanning rather than the optical scaling, and stores the image data obtained by the scanning in the RAM 0202. More specifically, the CPU 0201 sends to the scanner 0113 a command to perform ordinary scanning, that is, full-scale reading operation, instead of the command to execute the optical scaling processing. Receiving the command, the scanner 0113 carries out the full-scale reading operation (normal-speed scanning) instead of the optical scaling according to the command, and obtains the full-scale image data.

Thus, the image data stored in the RAM 0202 at step 0908 is image data before the scaling processing. Accordingly, the spacing a of FIG. 7 in the image data is identical to the spacing a in the source document, and the spacing b in the image data in FIG. 7 is identical to the spacing b in the source document. Consequently, the detecting processing of the LVBC from the image data stored in the RAM 0202 at step 0908 makes it possible to achieve accurate LVBC detection.

At step 0909, the CPU 0201 performs necessary digital scaling of the image data stored in the RAM 0202 at step 0908 by using the image scaling unit 0260, and stores the image data passing through the scaling in the RAM 0202. In other words, the CPU 0201 executes the digital scaling processing in the subscanning direction of the source document to meet the set scaling factor. Thus, the image data stored in the RAM 0202 at step 0909 has undergone the prescribed scaling processing in the subscanning direction.

On the other hand, if the scaling factor is 50% at step 0907, the CPU 0201 executes the 50% optical scaling scanning at step 0910 in the same manner as at step 0905, and stores the image data obtained in the RAM 0202. Incidentally, the image data stored in the RAM 0202 at this step is the 50% reduction image data by the optical scaling, and has undergone the prescribed scaling processing in the subscanning direction.

If the scaling factor is less than 50% at step 0907, that is, if the scaling factor is below the limit of the optical scaling, the CPU 0201 executes the combination processing. Thus, the CPU 0201 carries out the 50% reduction scanning, the limit of the optical scaling of the scanner 0113, at step 0911 in the same manner as at step 0905, and stores the obtained image data in the RAM 0202. At step 0912, the CPU 0201 performs, in the same manner as at step 0906, the digital scaling processing corresponding to the remaining reduction factor on the image data which has undergone the 50% reduction and stored in the RAM 0202 at step 0911 by using the image scaling unit 0260, and stores the image data subjected to the scaling in the RAM 0202.

Completing the scaling processing in the subscanning direction through the processing from the foregoing step 0907 to 0912, the CPU 0201 carries out the above-mentioned digital scaling processing in the main scanning direction and the printing processing (step 0913 and step 0914).

In FIG. 9, it is with respect to the image data stored in the RAM 0202 at steps 0908, 0910 and 0911 that the analysis of the LVBC is performed using the information extraction unit 0270. The image data on the RAM 0202 after the processing at step 0908 is the data that is scanned at the scaling factor of 100% in the main scanning/subscanning direction as the image data 802 shown in FIG. 8 and is not scaled up or down.

Accordingly, the analysis of the LVBC can be performed from the image data just as it is after the processing at step 0908 by using the information extraction unit 0270. More specifically, the information extraction unit 0270 analyzes the LVBC from the image data before undergoing the digital scaling processing by the digital scaling unit 0260 and extracts the encoded information. Thus, since neither the reduction at the prescribed reduction factor nor the enlargement by the subsequent reverse scaling processing is carried out, there are no changes in the grid spacing of the LVBC, and this enables reliable extraction of the LVBC.

On the other hand, as for the image data on the RAM 0202 after the processing at step 0910 and 0911, since it undergoes 100% scaling in the main scanning direction and 50% scaling in the subscanning direction, the analysis of the LVBC cannot be performed from the image data just as it is. Thus, the analysis of the LVBC using the information extraction unit 0270 is carried out about the image data after performing 200% scaling on the subscanning direction. However, since the scaling factor is 200%, the LVBC can be analyzed correctly because unlike the image data 605 that undergoes the reverse scaling processing by the digital scaling as shown in FIG. 6, the 200% scaling does not cause any calculation error. In this way, setting the scaling factor for performing the optical scaling at the scaling factor that does not cause any calculation error (scaling factor suitable for optical scaling) in the reverse scaling processing makes it possible to prevent the changes in the grid spacing of the LVBC even when performing the reverse scaling processing for the LVBC analysis, thereby being able to extract the LVBC reliably.

Incidentally, in FIG. 9, although the combination scaling processing is applied to the scaling factor outside the scaling factor limits of the optical scaling (when the scaling factor is less than 50%), this is not essential. For example, it is also possible to execute only the digital scaling processing.

The present embodiment sets 50%, one of the scaling factors suitable for optical scaling, as the threshold, and controls in such a manner as to perform the digital scaling processing when the scaling factor is greater than 50% and less than 100%. Naturally, the scaling factors suitable for optical scaling are present in a range where the scaling factor is less than 50% (25%, for example). However, one of the objects of the present invention is to carry out the digital scaling rather than the optical scaling in the subscanning direction of the source document when performing the scaling at a scaling factor other than at least one of the scaling factors suitable for optical scaling. Thus, in the range where the scaling factor X<50%, the combination scaling is carried out using the scaling factor suitable for optical scaling, which can achieve the object. Accordingly, as described above, the scaling factor for carrying out the digital scaling rather than the optical scaling becomes the scaling factor other than at least one of the scaling factors suitable for optical scaling.

For this reason, the processing shown in FIG. 9 sets the scaling factor for performing the optical scaling at 50%, one of the scaling factors suitable for optical scaling. However, it is also possible to carry out the optical scaling at another scaling factor of the scaling factors suitable for optical scaling. In this case, if the scaling factor obtained as a result of the decision of the scaling factor X at step 907 is a scaling factor suitable for optical scaling, the optical scaling processing can be executed at the scaling factor in the same manner as at step 0910.

Next, referring to FIG. 10, the optical scaling processing and the digital scaling processing will be described in the case where the scaling copying is set at a scaling factor exceeding 100%.

Since the processing contents at steps 1001 and 1002 in FIG. 10 are the same as those at steps 0901 and 0902 of the foregoing FIG. 9, their description will be omitted here.

At step 1003, the CPU 0201 makes a decision as to what percentage the scaling factor X is which is stored in the RAM 0202 (set by the user) at step 1001. As a result of the decision, if the set scaling factor X is less than 200% and is 100% or more, the processing proceeds to step 1004, at which the CPU 0201 performs scaling by the optical scaling scanning in the same manner as at step 0904, and stores the image data obtained by the optical scaling scanning in the RAM 0202. Here, the image data stored in the RAM 0202 at this step has undergone the prescribed scaling processing in the subscanning direction.

On the other hand, if the decision is made at step 1003 that the scaling factor is greater than 200%, that is, if the scaling factor exceeds the limit of the optical scaling, the CPU 0201 executes the combination processing. First, at step 1005, the CPU 0201 executes the 200% enlargement, the limit scaling factor of the optical scaling of the scanner 0113, and stores the data passing through the enlargement in the RAM 0202 temporarily. More specifically, the CPU 0201 sends to the scanner 0113 a command to carry out the optical scaling processing in such a manner as to perform enlargement at the scaling factor 200%. The scanner 0113 obtains the image data enlarged to 200% in accordance with the command, and stores it in the RAM 0202. Subsequently, at step 1006, the CPU 0201 performs the digital scaling processing corresponding to the remaining enlargement factor on the image data which has undergone the 200% enlargement and stored in the RAM 0202 at step 1005 using the image scaling unit 0260, and stores the image data subjected to the scaling in the RAM 0202. The image data passing through steps 1005 and 1006 and stored in the RAM 0202 has undergone the prescribed scaling processing in the subscanning direction At step 1013, the CPU 0201 performs in the main scanning direction the digital scaling processing of the image data that has undergone the prescribed scaling processing in the subscanning direction and stored in the RAM 0202 by using the image scaling unit 0260. At step 1014, the CPU 0201 delivers the image data stored in the RAM 0202 at step 1013 to the printer unit 0114 to print on paper, and completes a series of the processing.

On the other hand, if the CPU 0201 makes a decision at step 1002 that it is necessary to extract the LVBC, the processing proceeds to step 1007. At step 1007, the CPU 0201 makes a decision as to what percentage the scaling factor X is which is stored in the RAM 0202 (set by the user) at step 1001.

As a result of the decision, if the set scaling factor X is less than 200% and greater than 100%, the CPU 0201 proceeds to step 1008 to perform normal-speed scanning rather than the optical scaling, and stores the image data obtained by the scanning in the RAM 0202. Here, the image data stored in the RAM 0202 at step 1008 is the image data before the scaling processing. Accordingly, the spacing a of FIG. 7 in the image data is identical to the spacing a in the source document, and the spacing b in the image data in FIG. 7 is identical to the spacing b in the source document. Consequently, the detecting processing of the LVBC from the image data stored in the RAM 0202 at step 1008 makes it possible to achieve accurate LVBC detection.

At step 1009, the CPU 0201 performs necessary digital scaling of the image data stored in the RAM 0202 at step 1008 by using the image scaling unit 0260, and stores the image data passing through the scaling in the RAM 0202. Here, the image data stored in the RAM 0202 at step 1009 has undergone the prescribed scaling processing in the subscanning direction.

On the other hand, if the scaling factor is 200% at step 1007, the CPU 0201 executes the 200% optical scaling scanning at step 1010 in the same manner as at step 1005, and stores the image data obtained in the RAM 0202. Here, the image data stored in the RAM 0202 at this step is the 200% enlarged image data by the optical scaling, and has undergone the prescribed scaling processing in the subscanning direction.

If the scaling factor is greater than 200% at step 1007, that is, if the scaling factor exceeds the limit of the optical scaling, the CPU 0201 executes the combination processing. Thus, the CPU 0201 carries out the 200% enlargement scanning, the limit of the optical scaling of the scanner, at step 1011 in the same manner as at step 1005, and stores the obtained image data in the RAM 0202. At step 1012, the CPU 0201 performs, in the same manner as at step 1006, the digital scaling processing corresponding to the remaining enlargement factor on the image data which has undergone the 200% enlargement and stored in the RAM 0202 at step 1011 by using the image scaling unit 0260, and stores the image data subjected to the scaling in the RAM 0202. The image data stored in the RAM 0202 through steps 1011 and 1012 has undergone the prescribed scaling processing in the subscanning direction.

Completing the scaling processing in the subscanning direction through the processing from the foregoing step 1007 to 1012, the CPU 0201 carries out the above-mentioned digital scaling processing in the main scanning direction and the printing processing (step 1013 and step 1014).

In FIG. 10, it is with respect to the image data stored in the RAM 0202 at steps 1008, 1010 and 1011 that the analysis of the LVBC is performed using the information extraction unit 0270. The image data on the RAM 0202 after the processing at step 1008 is the data that is scanned at the scaling factor of 100% in the main scanning/subscanning direction as the image data 802 shown in FIG. 8 and is not scaled up or down. Accordingly, the analysis of the LVBC can be performed from the image data just as it is after the processing at step 1008 by using the information extraction unit 0270. More specifically, the information extraction unit 0270 analyzes the LVBC from the image data before undergoing the digital scaling processing by the digital scaling unit 0260 and extracts the encoded information. Thus, since neither the reduction at the prescribed reduction factor nor the enlargement by the subsequent reverse scaling processing is carried out, there are no changes in the grid spacing of the LVBC, and this enables reliable extraction of the LVBC.

On the other hand, as for the image data on the RAM 0202 after the processing at step 1010 and 1011, since it undergoes 100% scaling in the main scanning direction and 200% scaling in the subscanning direction, the analysis of the LVBC cannot be performed from the image data just as it is. Thus, the analysis of the LVBC using the information extraction unit 0270 is carried out about the image data after performing 50% reduction scaling on the subscanning direction. However, since the scaling factor is 50%, the LVBC can be analyzed correctly because unlike the image data 605 that undergoes the reverse scaling processing by the digital scaling as shown in FIG. 6, the 50% scaling does not cause any calculation error.

In this way, unless the set scaling factor is at least one of the scaling factors suitable for optical scaling, the present embodiment carries out the digital scaling processing rather than the optical scaling processing. Thus, as to the scaling factor unsuitable for the optical scaling, since the digital scaling rather than the optical scaling is performed, the execution of the optical scaling can be limited to a case only when the set scaling factor is one of the scaling factors suitable for optical scaling. Accordingly, the encoded information can be analyzed correctly regardless of the scaling factors.

In addition, since the present embodiment can carry out the optical scaling when the set scaling factor is one of the scaling factors suitable for optical scaling, it can arrest the deterioration in the image quality due to scaling.

Other Embodiments

The present invention is applicable not only to a system consisting of a plurality of devises (such as a computer, interface unit, reader, and printer), but also to an apparatus consisting of a single device (such as a multifunction machine, printer and fax machine).

The foregoing embodiment places under its category a processing method that stores in a storage medium a program for operating the configuration of the foregoing embodiment in such a manner as to implement the functions of the embodiment, reads the program stored in the storage medium as code, and causes a computer to execute the program code. Accordingly, a computer readable storage medium belongs to the scope of the embodiment. Thus, it is a matter of course that a storage medium that stores the computer program belongs to the foregoing embodiment, and in addition, the computer program itself belongs to them.

As the storage medium, a floppy (registered trademark) disk, hard disk, optical disk, magneto-optical disk, CD-ROM, magnetic tape, nonvolatile memory card, and ROM can be used, for example.

In addition, the foregoing embodiment places under its category not only the case of executing the processing by only the program stored in the storage medium mentioned above, but also a program operating on an OS for executing the operation of the foregoing embodiment in conjunction with other software and the functions of an expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-43339, filed Feb. 25, 2008, which is hereby incorporated by reference herein in its entirety.

What is claimed is:

1. An image processing apparatus receiving an image from an image reading device capable of optical scaling, the image processing apparatus comprising:
   an acquiring component configured to acquire a set scaling factor;
   a deciding component configured to make a decision as to whether the received image includes encoded information or not;
   a digital scaling component configured to carry out digital scaling of said received image;
   a detecting component configured to detect encoded information from said received image;
   an optical scaling instruction component configured to instruct said image reading device to execute optical scaling processing when said deciding component decides that said received image includes said encoded information, and when said scaling factor acquired by said acquiring component is a scaling factor that will not cause any calculation error when returning an image having undergone optical scaling to a full-scale image, again; and
   a full-scale reading instruction component configured to instruct said image reading device to execute full-scale reading operation rather than optical scaling processing when said deciding component decides that said received image includes said encoded information, and when said scaling factor acquired by said acquiring component is a scaling factor other than scaling factors that will not cause any calculation error when returning said image having undergone optical scaling to a full-scale image, again, wherein
   when receiving from said image reading device an image said image reading device acquires in accordance with the reading instruction from said full-scale reading instruction component,
   said detecting component detects said encoded information from said image acquired; and
   said digital scaling component carries out digital scaling of said image acquired.

2. The image processing apparatus as claimed in claim 1, wherein said digital scaling is combined with optical scaling when said acquiring component acquires a scaling factor outside a scaling factor range that sets limits of said optical scaling by said image reading device.

3. The image processing apparatus as claimed in claim 1, wherein said optical scaling instruction component instructs said image reading device to execute said optical scaling processing when said scaling factor acquired by said acquiring component is a prescribed scaling factor in said scaling factors that will not cause any calculation error when returning an image having undergone said optical scaling to a full-scale image again;
   wherein said image processing apparatus further comprises a determination unit configured to determine whether said scaling factor acquired by said acquiring component is a prescribed scaling factor that will not cause any calculation error when returning an image having undergone said optical scaling to a full-scale image again; and
   wherein in a case where the acquired scaling factor is determined not to be one that will not cause any calculation error when returning an image having undergone said optical scaling to a full-scale image again, said full-scale reading instruction component instructs said image reading device to execute said full-scale reading operation.

4. The image processing apparatus as claimed in claim 1, further comprising:
   a component configured to instruct said image reading device to execute said optical scaling processing when said deciding component decides that said received image does not include said encoded information.

5. A control method of an image processing apparatus that receives an image from an image reading device capable of optical scaling, wherein the image processing apparatus comprises a processor and memory storing computer-executable process steps that cause the processor to execute the method, wherein the method comprises:
   acquiring a set scaling factor;
   making a decision as to whether the received image includes encoded information or not;
   instructing said image reading device to execute optical scaling processing when the step of making a decision decides that said received image includes said encoded information, and when said scaling factor acquired in the step of acquiring is a scaling factor that will not cause any calculation error when returning an image having undergone optical scaling to a full-scale image, again;
instructing said image reading device to execute full-scale reading operation rather than optical scaling processing when the step of making a decision decides that said received image includes said encoded information, and when said scaling factor acquired in the step of acquiring is a scaling factor other than scaling factors that will not cause any calculation error when returning an image having undergone optical scaling to a full-scale image, again;
receiving from said image reading device an image said image reading device acquires in accordance with the reading instruction issued at the step of instructing said image reading device to execute full-scale reading;
detecting said encoded information from said image acquired; and
carrying out digital scaling of said image acquired.

6. The control method as claimed in claim 5, wherein said digital scaling is combined with optical scaling when said step of acquiring acquires a scaling factor outside a scaling factor range that sets limits of said optical scaling by said image reading device.

7. The control method as claimed in claim 5, wherein the step of instructing said image reading device to execute optical scaling processing instructs said image reading device to execute said optical scaling processing when said scaling factor acquired at the step of acquiring is a prescribed scaling factor in said scaling factors that will not cause any calculation error when returning an image having undergone said optical scaling to a full-scale image again;
wherein said control method further comprises determining whether said acquired scaling factor is a prescribed scaling factor that will not cause any calculation error when returning an image having undergone said optical scaling to a full-scale image again; and
wherein in a case where the acquired scaling factor is determined not to be one that will not cause any calculation error when returning an image having undergone said optical scaling to a full-scale image again, the step of instructing said image reading device to execute said full-scale reading operation instructs said image reading device to execute said full-scale reading operation.

8. The control method as claimed in claim 5, further comprising the step of:
instructing said image reading device to execute said optical scaling processing unless the step of making a decision decides that said received image includes said encoded information.

9. A non-transitory computer-readable memory medium storing process steps executable by an image processing apparatus that receives an image from an image reading device capable of optical scaling, wherein the process steps cause the image processing apparatus to execute a method comprising:
acquiring a set scaling factor;
making a decision as to whether the received image includes encoded information or not;
instructing said image reading device to execute optical scaling processing when the step of making a decision decides that said received image includes said encoded information, and when said scaling factor acquired in the step of acquiring is a scaling factor that will not cause any calculation error when returning an image having undergone optical scaling to a full-scale image, again;
instructing said image reading device to execute full-scale reading operation rather than optical scaling processing when the step of making a decision decides that said received image includes said encoded information, and when said scaling factor acquired in the step of acquiring is a scaling factor other than scaling factors that will not cause any calculation error when returning an image having undergone optical scaling to a full-scale image, again;
receiving from said image reading device an image said image reading device acquires in accordance with the reading instruction issued at the step of instructing said image reading device to execute full-scale reading;
detecting said encoded information from said image acquired; and
carrying out digital scaling of said image acquired.

10. The non-transitory computer-readable memory medium as claimed in claim 9, wherein said digital scaling is combined with optical scaling when said step of acquiring acquires a scaling factor outside a scaling factor range that sets limits of said optical scaling by said image reading device.

11. The non-transitory computer-readable memory medium as claimed in claim 9, wherein the step of instructing said image reading device to execute optical scaling processing instructs said image reading device to execute said optical scaling processing when said scaling factor acquired at the step of acquiring is a prescribed scaling factor in said scaling factors that will not cause any calculation error when returning an image having undergone said optical scaling to a full-scale image again;
wherein said method further comprises determining whether said acquired scaling factor is a prescribed scaling factor that will not cause any calculation error when returning an image having undergone said optical scaling to a full-scale image again; and
wherein in a case where the acquired scaling factor is determined not to be one that will not cause any calculation error when returning an image having undergone said optical scaling to a full-scale image again, the step of instructing said image reading device to execute said full-scale reading operation instructs said image reading device to execute said full-scale reading operation.

12. The non-transitory computer-readable memory medium as claimed in claim 9, wherein the method further comprises:
instructing said image reading device to execute said optical scaling processing unless the step of making a decision decides that said received image includes said encoded information.

* * * * *